Patented June 20, 1939

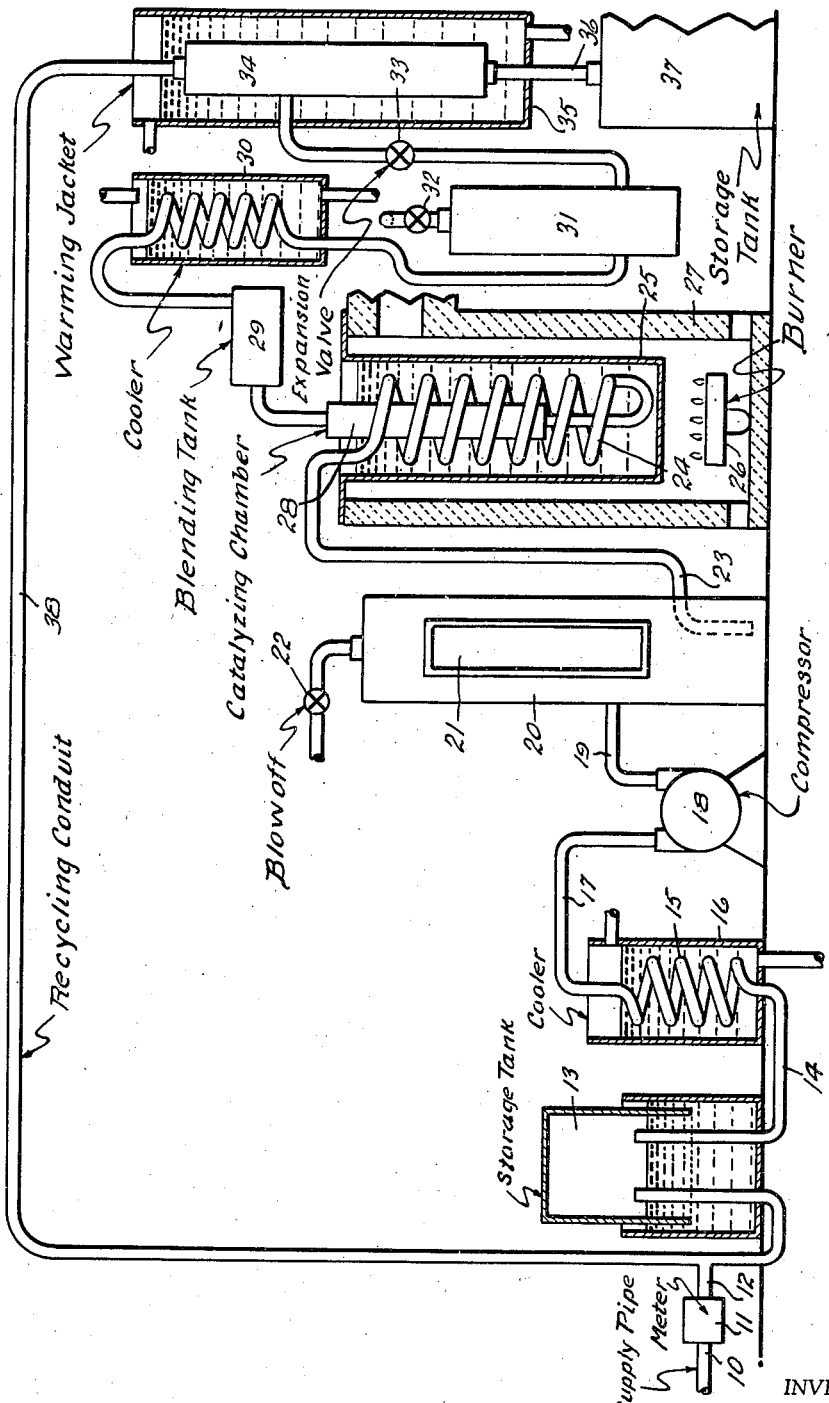

2,163,155

UNITED STATES PATENT OFFICE 2,163,155

PROCESS OF CONVERTING GASEOUS HY-
DROCARBON MATERIAL INTO NORMALLY
LIQUID HYDROCARBON MATERIAL

James R. Rose, Edgeworth, Pa.

Application November 22, 1937, Serial No. 175,886

3 Claims. (Cl. 196—10)

This invention relates to a process of converting normally gaseous hydrocarbon material into normally liquid hydrocarbon material, and has particular reference to the treatment of petroleum refinery gases for the conversion thereof into liquid hydrocarbon material in the nature of gasolene.

The principal object of the invention is to provide for obtaining greater yields of liquid material than has heretofore been possible.

I accomplish the above and other and more limited objects by the process and by the use of the preferred apparatus hereinafter described and illustrated in the drawing, wherein the figure is a flow diagram illustrating such preferred apparatus and the relation of the various pieces of such apparatus to one another.

It is known that normally gaseous hydrocarbons produced in the refinement of petroleum can be caused to condense or polymerize by subjecting them to the action of a suitable catalyst in the gaseous state. I have discovered that the yield of liquid hydrocarbon can be greatly increased if these gases are first liquefied, by subjecting them to pressure at temperatures below their critical temperatures for liquefaction; are cracked by heat while being maintained under such pressure and the cracked product is then subjected to the catalyst specified herein while under such pressure; and the pressure thereafter reduced to a working pressure of say 5 to 25 lbs. per square inch. I have discovered also that the particular catalyst set forth herein is also more effective than others that have been in general use for catalyzing the polymerization of these gases under usual conditions as well as being peculiarly effective under the conditions above set forth. Where my new process includes the use of my new catalyst, the yield is remarkably increased over that obtainable by other processes with which I am familiar. For example, by the combination of my new process and new catalyst, I have obtained an average yield from refinery gases of as much as 14 to 15 gallons per 1000 cu. ft. and from waste refinery gases an average yield of approximately 5 gallons per 1000 cu. ft., the product being of high gravity and octane number, ranging between 65 and 85 specific gravity and between 90 and 110 octane number, with an initial boiling point of from 60° to 70° F. and with an 80% recovery at 300° F. end point.

In the drawing, I have shown schematically one apparatus which may be used in carrying out my process. This apparatus is adapted for continuous operation and is only an example of divers forms of apparatus which may be employed. The gaseous hydrocarbons are led through a pipe 10, meter 11 and pipe 12 to an expansible gas storage tank 13. From the storage tank 13, they are drawn off through a pipe 14 and passed through a cooling coil 15 which may be immersed in a cooling fluid contained in a receptacle 16. From the coil 15, the so-cooled gases, which have been cooled below the critical temperature for liquefaction, pass through a pipe 17 to the compressor 18 where they are subjected to a pressure of from 500 to 1500 lbs. per square inch and from which they are delivered in liquid condition, or largely in liquid condition, through a pipe 19 to a liquid column holder 20 which may be provided with an inspection window 21 and a blow off valve 22 through which any unliquefied portion may be removed.

From the bottom of the holder 20, the liquefied material passes through a pipe 23 to a coil 24 immersed in a heat absorbing and transferring fluid contained in a receptacle 25. The fluid in the receptacle 25 is heated by means of the burner 26 and the whole is contained within an enclosure 27. By the time the liquefied material has passed through the coil 24, it has assumed substantially the temperature of the fluid in the receptacle 25, which temperature is such as to crack the previously liquefied material. I prefer to use a temperature of from 500° to 1500° F. at this point.

After having traversed the coil 24, the cracked material passes through the catalyzing chamber 28, where it intimately contacts the catalyst contained therein. The vaporous material then passes to a blending and reaction tank 29, where the reaction initiated in the catalyst chamber may be continued. The size of the tank 29 will be so chosen as to permit continuation of the reaction during such time as the reaction proceeds at a sufficiently high rate to increase the yield to a substantial extent. From the chamber 29, the vaporous material passes to a cooler 30 where its temperature is reduced to between 50° and 75° F. and is again liquefied; and thence to a tank 31, provided with a blow off valve 32, wherein the material which is of an intermediate nature between the liquid and the gaseous state, (such as heavy vapors or floating globules of liquid) may coalesce and unite with the body of liquid, while uncondensed gases unsuitable for recycling may be vented through said valve. From the tank 31 the liquid may pass to an expansion valve or pressure relief valve 33, which preferably is in the nature of a variable restriction. By means of the expansion valve 33, the pressure of the material is reduced to an ordinary working pressure of say from 5 to 25 lbs. per square inch and enters a low pressure receptacle 34 which is warmed by means of a suitable fluid contained in the receptacle 35 so as to overcome the cooling effect induced by the escape of the liquid through the expansion valve 33.

In the receptacle 34, that portion of the material which has been converted into normally liquid hydrocarbon will remain liquid and pass through the pipe 36 to the storage tank 37. The portion which has not been sufficiently polymerized to remain liquid under normal pressure and temperature conditions is re-cycled, passing through the conduit 38 and entering the gas storage receptacle 13.

It will be noted that such gases as are not liquefiable do not collect in the system but are liberated at the points 22 and 32, where they may be recovered for other uses if desired.

It will be noted also that between the compressor 18 and the expansion valve 33, the passage containing the material being treated is under high pressure, the same being controlled by the capacity and rate of operation of the compressor 18 and the adjustment of the expansion valve 33. Within this region of the treatment-passage, there are portions wherein the material being treated is liquid and a portion wherein it is in a vaporous condition, the difference in phase being brought about by the elevation of the temperature in the coil 24 and by the catalyzing chamber 28. Thus, by suitable manipulation of the temperature and of the expansion valve 33, the pressure is maintained high throughout the region between the compressor 18 and the said valve and the material is nevertheless changed from liquid phase to vapor phase and back again.

The catalyst which I prefer to employ and which has proven to be peculiarly useful in connection with this process is of approximately the following composition:

| | Parts by weight |
|---|---|
| Natural phosphate rock | 20 to 100 |
| Carnotite ore | 20 to 100 |
| Zinc phosphate | 5 to 20 |
| Barium halide | 3 to 12 |

The most advantageous proportion is approximately as follows:

| | Parts by weight |
|---|---|
| Natural phosphate rock | 40 |
| Carnotite ore | 40 |
| Zinc phosphate | 10 |
| Barium halide, preferably the chloride | 6 |

Having thus described my invention, what I claim is:

1. The process of manufacturing liquid hydrocarbons suitable for motor fuel from refinery gases containing saturates and unsaturates which comprises: liquefying the said gases under a pressure of from 500 to 1500 pounds per square inch; heating the resultant liquid while under said pressure to a temperature of from 500° F. to 1500° F., thereby to crack the same; contacting the resultant material, while under the said pressure, with a polymerization catalyst; cooling the resultant material to a temperature of from 50° F. to 75° F. while under the polymerization pressure; venting uncondensed gases from the system; and reducing the pressure on the resultant liquid, thereby to separate, from the liquid polymer, gases suitable for recycling; the said catalyst comprising the following ingredients in substantially the following proportions by weight

| | Parts |
|---|---|
| Natural phosphate rock | 20 to 100 |
| Carnotite ore | 20 to 100 |
| Zinc phosphate | 5 to 20 |
| Barium halide | 3 to 12 |

2. In the process recited in claim 1, the additional step of recycling the gases, suitable for recycling, which have been separated from the liquid polymer consequent upon the reduction in pressure upon the latter.

3. The process of manufacturing liquid hydrocarbons suitable for motor fuel from refinery gases containing saturates and unsaturates which comprises: liquefying the said gases under a pressure of from 500 to 1500 pounds per square inch; heating the resultant liquid while under said pressure to a temperature of from 500° F. to 1500° F., thereby to crack the same; contacting the resultant material, while under the said pressure, with a polymerization catalyst; cooling the resultant material to a temperature of from 50° F. to 75° F. while under the polymerization pressure; venting uncondensed gases from the system; and reducing the pressure on the resultant liquid, thereby to separate, from the liquid polymer, gases suitable for recycling; recycling the gases thus separated from the liquid polymer; the said catalyst comprising the following ingredients in substantially the following proportions by weight:

| | Parts |
|---|---|
| Natural phosphate rock | 40 |
| Carnotite ore | 40 |
| Zinc phosphate | 10 |
| Barium chloride | 6 |

JAMES R. ROSE.